March 2, 1954     F. M. OWEN     2,670,976
FLEXIBLE JOINT AND SEALING ELEMENT THEREFOR
Filed May 11, 1950
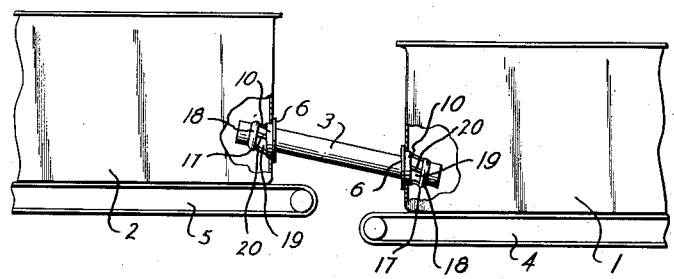
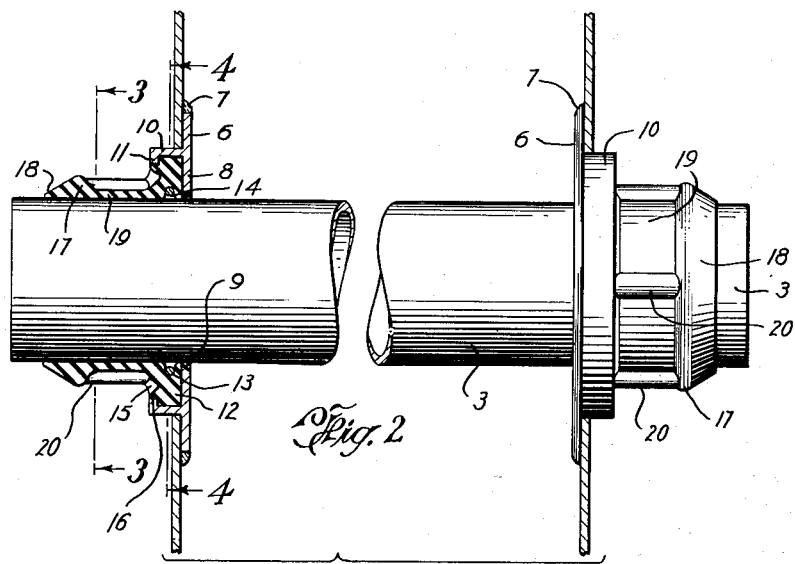
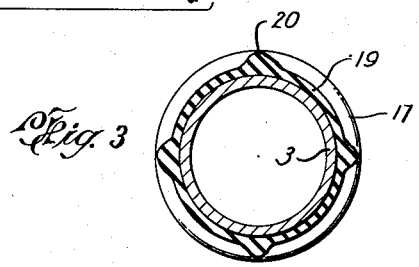
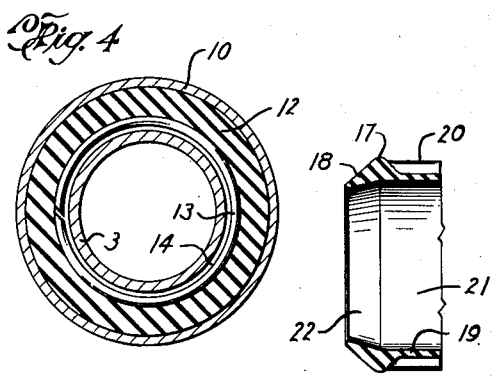
Frank M. Owen
INVENTOR.
BY
ATTORNEYS Patented Mar. 2, 1954

2,670,976

UNITED STATES PATENT OFFICE 2,670,976

FLEXIBLE JOINT AND SEALING ELEMENT THEREFOR

Frank M. Owen, Houston, Tex.

Application May 11, 1950, Serial No. 161,376

5 Claims. (Cl. 288—4)

This invention relates to pressure type joints and has for its general object the provision of an improved connection between a vessel and a pipe.

Ordinarily, connections between vessels and pipes of the nature contemplated by this invention are provided by such rigid means as threading the parts together, or providing mating flanges on the parts which flanges are bolted or otherwise mounted together, or welding the parts together. Such manner of connecting pipes to vessels has the disadvantages that they require tools for effecting the connection and disconnection of the pipe to the vessel, they constitute rigid connections which do not permit the flexibility often required in vessels used first on one location and then on another, the connecting parts when damaged may well incapacitate the entire vessel or the entire pipe, or both, to such an extent that they cannot be used further or can be used only after extensive and expensive repairs, and a pipe to be employed in connection with such connecting means must be cut to a predetermined dimension before it can be used and must then be provided with the portion of the joint which is carried by the pipe.

It is an object of this invention to provide such a connection which will be self-sealing against pressure in the vessel and in the pipe.

Another object is to provide such a connection which requires no threading or other positive joining of the material of the pipe to the material of the vessel.

Another object is to provide such a connection which, throughout its life, will accommodate longitudinal and rotational adjustments of the pipe or bar to be connected to a vessel.

Another object is to provide a flexible joint in which vibrations are dampened by the sealing element.

Another object is to provide such a connection which will not require any special alignment of the pipe with respect to the vessel.

Another object is to provide such a connection which will be flexible so as to allow changing in alignment within limits without breaking the seal or placing a stress or strain on the material of the pipe or vessel.

Another object is to provide such a connection which, once installed, may be disconnected or connected without tools.

Another object is to provide such a connection in which the sealing part may be readily replaced without tools.

Another object is to provide such a connection in which the sealing part may have sufficient flexibility to enable it to flex and preserve a seal for various relative positions of the vessel and pipe, yet sufficient stiffness and strength to prevent it from becoming distorted in assembly or disassembly of the joint.

Another object is to provide such a connection in which the pipe sealing portion of the sealing member is bodily movable with respect to that portion of a sealing member which is in engagement with the vessel, yet possessed of sufficient inherent stiffness and body to keep its shape and perform its sealing function during the flexing of the joint and in such distorted position.

Another object is to provide such a joint in which it is unnecessary that the pipe ends be of any predetermined length or be subjected to any predetermined treatment before use in connection with the joint.

Another object is to provide such a connection in which a perfect joint may be obtained even though the pipe may be slightly out of shape or the surfaces to be sealed against damaged in some fashion.

Other objects and advantages of this invention will become apparent from the following description taken in connection with the accompanying drawings in which is set forth by way of illustration and example one embodiment of this invention.

In the drawings:

Figure 1 is a view in side elevation with parts broken away and shown in cross section illustrating two tanks connected together with a pipe, the joints between the pipe and the tanks respectively being provided by a connection constructed in accordance with this invention.

Figure 2 is a view on a much larger scale, partly in elevation and partly in longitudinal cross section illustrating the joints shown in Figure 1.

Figure 3 shows a transverse cross section taken along the line 3—3 of Figure 2.

Figure 4 shows a transverse cross section taken along the line 4—4 of Figure 2.

Figure 5 is a fragmentary view in longitudinal cross section illustrating the sealing end portion of the sealing element without any pipe in position therein and showing the position which the parts occupy when undistorted.

Referring now more in detail to the drawings, the numerals 1 and 2 indicate tanks which may be for any purpose for which such tanks may be employed, the particular tanks here illustrated being tanks of the type employed in the drilling of wells in the handling of the drilling fluid.

These tanks 1 and 2 are illustrated as being joined together by a pipe 3 and as resting upon supports in the form of skids 4 and 5 respectively.

Referring now more in detail to the nature of the connections between the pipe 3 and the respective tanks, it will be seen that in each case there is a bracket which may be formed of metal or some other relatively rigid material as compared with the sealing element later to be described, this bracket having a radially extending outer flange 6 which is shown as being welded to the tank wall by a welding bead 7. It will be understood that in place of welding these parts together they may be joined in any other conventional fashion of which a number are well known, the manner of joining the bracket to the tank wall forming no part of this invention.

The bracket also has a radially inwardly extending flange 8 which has an opening therethrough of a diameter slightly larger than the outer diameter of the pipe 3 with which the connection is to cooperate. Preferably this inner edge of the flange 8 is rounded or chamfered at 9 so as not to interfere with flexing or swinging of the pipe 3 with respect to the tank in the event such swinging should take place.

The bracket also has an axially extending annular flange 10 spaced somewhat from the inner extremity of the flange 8, and having a depending flange 11 at its free edge, so that the flanges 8, 10 and 11 provide an inwardly opening channel.

The bracket just described is for the purpose of receiving and anchoring the sealing element forming a part of this joint. This sealing element, as illustrated, is formed of a flexible sealing material and has adjacent one end thereof an outer annular enlargement which may be referred to as an anchoring portion and is designated by the numeral 12. This enlargement fits within the channel provided by the flanges 8, 10 and 11, and is adapted to be retained therein by means of a spring retaining ring 13 fitting in a channel 14 in the inner surface of the sealing member. It is noted that this spring retaining ring is embedded in the material of the sealing element to such an extent that it lies entirely within the regular inner contour of the element and does not in any manner contact a pipe 3 extending through the sealing element. It is split so that it may expand and hold the anchoring portion 12 in engagement with the channel in the bracket, and is located between the extremities of this channel in order to better perform this function.

In its surface remote from the flange 8, the anchoring enlargement 12 of the sealing element is undercut as illustrated at 15 for the purpose of providing a sealing lip 16 against which pressure may bear for the purpose of holding this sealing lip 16 in sealing engagement with the bracket.

Spaced a substantial distance longitudinally from the anchoring enlargement 12 is a reinforcing annular outer enlargement 17 on the sealing element, this enlargement being for the purpose of providing a strong annular ring on the sealing element so that the sealing element will continue to grip the pipe 3 even when this sealing element is distorted laterally with respect to the anchoring portion 12, as by the swinging of the pipe 3 with respect to the tank. The reinforcing enlargement 17 carries the sealing portion of the sealing element which is in the form of a tapering lip 18 extending from the reinforcing enlargement 17 in a direction opposite from the anchoring enlargement 12, and terminating in a feather edge which is adapted to seal against the outer surface of the pipe 3 in the well known fashion employed in lip type seals generally.

The reinforcing enlargement 17 and the seal forming portion 18 are joined to the anchoring enlargement 12 by means of a portion of thinner wall cross section providing a sleeve 19. This sleeve is sufficiently thin so that it will not interfere substantially with the lateral flexing or movement of the reinforced portion 17 with respect to the anchoring portion 12. Furthermore, when the device is under pressure, pressure will act upon the exterior of this sleeve 19 and will force it into tight gripping engagement with the pipe 3 so as to tend to prevent the longitudinal movement of the pipe 3 with respect to the connection.

The sleeve 19, being thin walled and flexible, might be unduly elongated under tension, as during the time while the pipe 3 is being inserted into the joint, or might be buckled under compression, as during the time when the pipe 3 is being withdrawn, and in order to avoid this possibility, this sleeve 19 is reinforced by means of longitudinal ribs 20 which are integrally formed with the sealing member and extend between the external enlargements 12 and 17 to join them together.

It will readily be seen that the ribs 20, although they will stiffen the thin wall section against excessive elongation or against buckling, will nevertheless permit lateral movement of the reinforcing portion 17 with respect to the anchoring portion 12, and will not interfere with the action of pressure on the exterior of this sleeve-like portion in forcing the sleeve-like portion against a pipe which may be within the same.

In this connection it will be observed that the main portion of the sealing element is provided with a passage or opening therethrough which is of a diameter as indicated at 21 that is sufficient to receive the external diameter of the pipe 3, and preferably without any substantial distortion of the sealing element. However, the internal diameter of the sealing lip portion 18 is shown at 22 as being smaller than the internal diameter of the major portion of the sealing element as shown at 21, and as being tapered from the diameter of that major portion, at a point substantially within the reinforcing portion 17, to a diameter considerably smaller at the feather edge of the tapering sealing lip 18. This smaller diameter feather edge is preferably of such a diameter that when undistorted it will grip the exterior of the pipe 3 against which the seal is to be made and will grip it firmly so as to provide an initial seal. The pressure being sealed against, acting on the exterior of the sealing lip 18 will increase the pressure of this seal by whatever amount is indicated by the pressure being sealed against.

It will be observed that once the bracket in which the flexible sealing element is carried has been mounted within an opening in the wall of the tank or other vessel, no further tools are required either for installing the flexible sealing element or for connecting the pipe to the joint. The flexible sealing element may be inserted by hand and distorted until the anchoring enlargement 12 snaps into the channel provided by the flanges 8, 10 and 11 in the bracket, and may then be secured in such position by inserting the split ring 13 into the channel 14 and permitting it to expand therein.

The pipe 3 need not have any special preparation whatsoever and need not be cut to exact length. It may be found helpful to slightly round the end of the pipe for better ease of insertion without possibility of damage to the sealing element, but even this may be dispensed with if necessary. The pipe may be forced from the exterior into the sealing element and through the major portion thereof which is of a diameter to readily receive the pipe, this action requiring very little force. The pipe will then enter the lip sealing portion 18 by which it will be gripped with a substantial force, but may be forced through this portion fairly readily, and during this operation the thin wall sleeve section connecting the reinforcing enlargement 17 to the anchoring portion 12 will not be unduly stretched because of the presence of the ribs 20. Any excessive portion of the pipe 3 may be shoved on through the joint as far as desired.

Pressure within the pipe and within the joint will act upon the exterior of the sealing lip 18 to provide a seal between this lip and the pipe which will be commensurate with the amount of pressure sealed against. Furthermore, a tendency to force the pipe out of the joint will be counteracted at least in part by the gripping of the sleeve-like portion 19 against the pipe under the pressure being sealed against. At the same time, this pressure being sealed against will act upon the lip 16 to force it into tighter sealing engagement with the bracket.

The exterior of the pipe need not even be smooth because due to the flexible nature of the sealing element it will seal against even a rough exterior of a pipe. Furthermore, even though the pipe be slightly out-of-round, the sealing element is such as to accommodate itself to the out-of-round nature of the pipe and provide the seal.

In the event of the swinging of the pipe out of its normal alignment with respect to the opening in the tank or other vessel, as is illustrated in Figure 1, the result of such swinging will be to move the reinforcing portion 17 laterally with respect to the anchoring portion 12, this movement being readily permitted by the sleeve-like portion 19. However, this movement will not serve to distort substantially the reinforcing portion 17 nor the sealing lip 18 because these portions are made heavy enough to grip the pipe tightly and remain in position on the pipe without distortion.

When it is desired to disconnect the joint, all that is necessary after removing pressure from the sealing element is to pull the pipe out of the sealing element which can be accomplished in the same manner and with substantially the same force as that required to insert it in the first place. During this operation any buckling of the sleeve portion 19 will be prevented by virtue of the ribs 20.

It is to be noted that despite the fact that the ribs 20 prevent any excessive elongation or compression of the sleeve portion 19, this sleeve portion may, nevertheless, elongate and compress to a small extent due to the inherently flexible and elastic nature of the sealing element, so that the portion of the sealing element adjacent the reinforcing member 17, which grips the pipe tightly with a sealing engagement, may move slightly toward and away from the anchoring portion 12 of the sealing element in those cases where the pipe, by virtue of connection to a pump or the like, may tend to pulsate or vibrate longitudinally.

With the pipe removed from the sealing element, the sealing element may readily be replaced without the necessity for tools by merely removing the retaining ring 13, distorting the sealing element out of its position within the channel in the bracket, and replacing it in similar fashion with a new sealing element.

From the foregoing it will be appreciated that a means has been provided for carrying out and accomplishing all of the objects and advantages sought by this invention.

The invention having been described, what is claimed is:

1. In a flexible joint particularly adapted to form a seal with a pipe, a sealing element of flexible sealing material having a passage therethrough adapted to receive said pipe, said element having an enlarged annular outer anchoring portion and an enlarged annular outer reinforcing portion spaced longitudinally from said anchoring portion and an annular wall section substantially thinner than either of said annular portions interconnecting and extending between them to permit said annular reinforcing portion to move laterally with respect to said anchoring portion without substantial distortion of either of said enlarged portions, said thinner wall section having an internal diameter throughout its length substantially the same as the outside diameter of the pipe to be received therein, an annular sealing portion comprising a radially flexible annular lip tapering from said reinforcing portion to a terminus having an internal diameter smaller than that of said thinner wall section whereby, upon insertion of a pipe, the thinner wall section and lip can be urged into contact with the pipe by an external fluid pressure, and a rigid anchoring bracket of annular form with an opening therethrough at least as large as the internal diameter of said thinner wall section and means connecting the anchoring portion of the sealing element to said bracket.

2. In a flexible joint, a sealing element of flexible sealing material having a passage therethrough adapted to receive a pipe, said element having an enlarged annular outer anchoring portion and an enlarged annular outer reinforcing portion spaced longitudinally from said anchoring portion and a wall section thinner than either of said annular portions interconnecting and extending between them to permit said annular reinforcing portion to move laterally with respect to said anchoring portion without substantial distortion of either of said enlarged portions, said thinner wall section having substantially the same internal diameter throughout its length with such internal diameter being substantially the same as the outside diameter of the pipe to be received in the sealing element, and an annular sealing portion comprising a radially flexible annular lip at an end of said sealing element and extending from said reinforcing portion in the direction opposite said anchoring portion and when undistorted having an internal diameter tapering from that of said thin wall section to an internal diameter at the lip's extremity which is less than the internal diameter of the remainder of said element whereby upon insertion of the pipe and application of external fluid pressure to the sealing element, said lip and thinner wall section are in contact with said pipe throughout their combined length.

3. In a flexible joint, a sealing element of flexible sealing material having a passage therethrough adapted to receive a pipe, said element having an enlarged annular outer anchoring portion and an enlarged annular outer reinforcing portion spaced longitudinally from said anchoring portion and a wall section substantially thinner than either of said annular portions interconnecting and extending between them to permit said annular reinforcing portion to move laterally with respect to said anchoring portion without substantial distortion of either of said enlarged portions, said thinner wall section having substantially the same internal diameter throughout its length with such internal diameter being substantially the same as the outside diameter of the pipe to be received in the sealing element, and an annular sealing portion comprising an annular lip tapering from said reinforcing portion and having an internal diameter tapering from that of said thinner wall section to a smaller internal diameter whereby, upon insertion of said pipe and application of external fluid pressure to the sealing element, the thinner wall section and lip are in contact with the pipe throughout their length, and a rigid anchoring bracket of annular form with an opening therethrough at least as large as the internal diameter of said thinner wall section and having an inwardly facing annular channel embracing said enlarged annular anchoring portion of the flexible sealing element.

4. The joint of claim 3 wherein said element has an annular undercut channel extending partly into said enlarged annular anchoring portion and positioned radially inwardly of one flange of said bracket channel to provide a sealing lip against said flange of said bracket channel adapted to be sealed thereagainst by fluid under pressure.

5. The flexible joint of claim 4 in combination with an expandible split retaining ring spaced longitudinally between the inwardly extending flanges of said bracket channel and said retaining ring when expanded being of a diameter larger than the internal diameter of said passage so as to be located completely without the regular inner contour of the passage through said element.

FRANK M. OWEN.

References Cited in the file of this patent

UNITED STATES PATENTS

| Number | Name | Date |
|---|---|---|
| 704,425 | Allen | July 8, 1902 |
| 1,419,548 | Fay | June 13, 1922 |
| 2,097,571 | Moran | Nov. 2, 1937 |
| 2,099,722 | Byers | Nov. 23, 1937 |
| 2,170,915 | Schwgitzer | Aug. 29, 1939 |
| 2,252,240 | Tachappat | Aug. 12, 1941 |
| 2,459,005 | Shearman | Jan. 11, 1949 |
| 2,529,098 | Noll | Nov. 7, 1950 |
| 2,620,206 | Cornelius | Dec. 2, 1952 |